B. E. HELD.
CULTIVATOR.
APPLICATION FILED OCT. 11, 1909.
952,115.
Patented Mar. 15, 1910.
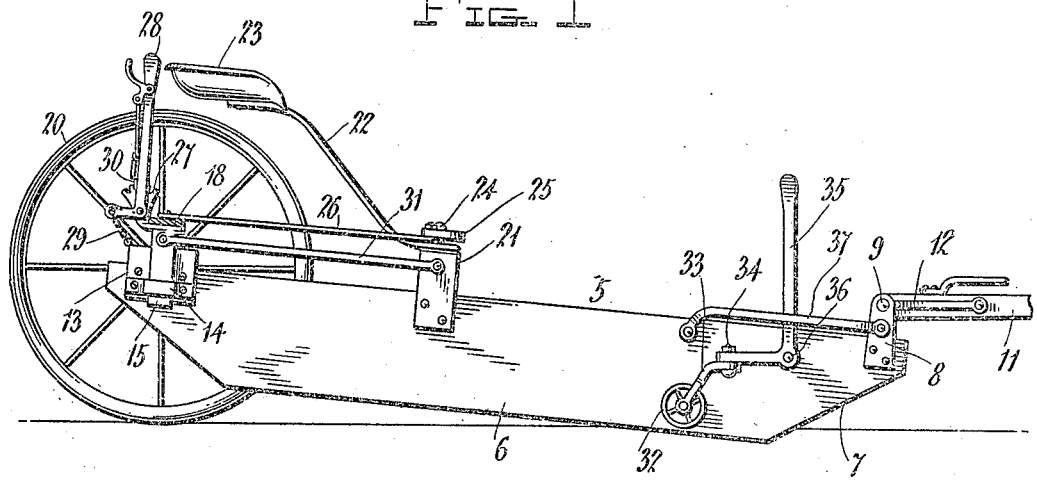
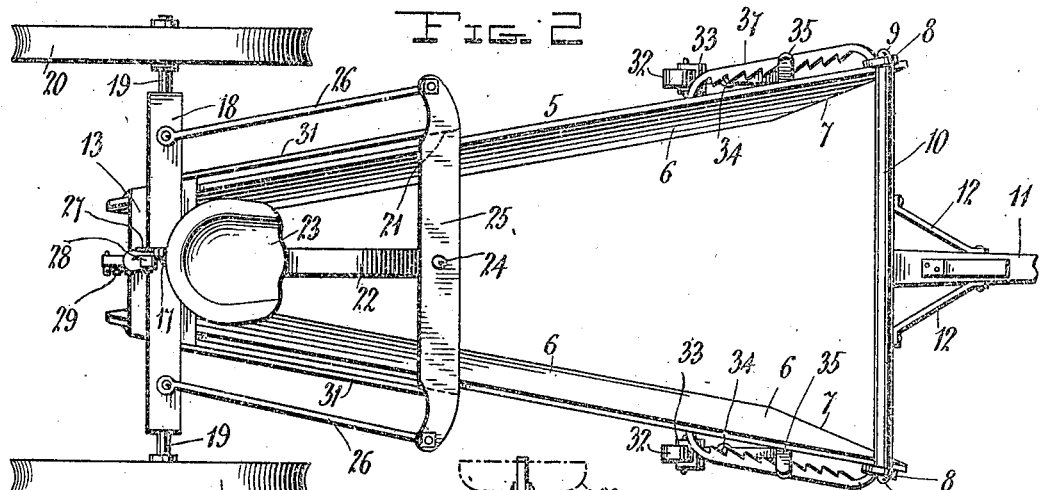
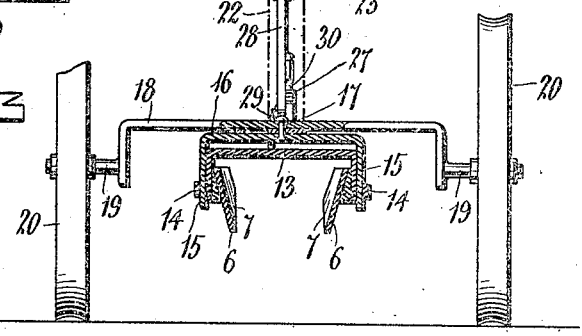
Inventor
Benjamin E. Held
By
Attorneys
Witnesses

UNITED STATES PATENT OFFICE.

BENJAMIN E. HELD, OF WAUPUN, WISCONSIN.

CULTIVATOR.

952,115.     Specification of Letters Patent.     Patented Mar. 15, 1910.

Application filed October 11, 1909. Serial No. 522,070.

*To all whom it may concern:*

Be it known that I, BENJAMIN E. HELD, a citizen of the United States, residing at Waupun, in the county of Fond du Lac, State of Wisconsin, have invented certain new and useful Improvements in Cultivators; and I do hereby declare the following to be a full, clear, and exact description of the invention, such as will enable others skilled in the art to which it appertains to make and use the same.

The invention relates to a cultivator and more particularly to the class of potato hillers.

The primary object of the invention is the provision of a machine of this character adapted to hoe or hill up the earth along the sides of rows of growing potato plants and also is capable of closing open furrows during its advancement through a field.

Another object of the invention is the provision of a machine of this character in which the plow boards are capable of adjustment relative to the ground so as to regulate the action of the same on the earth along the sides of a row of growing plants or when in service for closing open furrows.

A still further object of the invention is the provision of a machine in which the ground wheels supporting the plow boards may be adjusted to properly steer or guide the machine in its travel along the sides of growing plants and which plow boards are also adjustable relative to the earth.

A still further object of the invention is the provision of a machine of this character which is simple in construction, thoroughly reliable and efficient in operation, and inexpensive in the manufacture.

With these and other objects in view, the invention consists in the construction, combination and arrangement of parts, as will be hereinafter more fully described in detail, illustrated in the accompanying drawings, which disclose the preferred forms of embodiment of the invention, and as pointed out in the claim hereunto appended.

In the drawings:—Figure 1 is a side elevation of a machine constructed in accordance with the invention and being partly broken away. Fig. 2 is a top plan view thereof. Fig. 3 is a transverse sectional view.

Similar reference characters indicate corresponding parts throughout the several views in the drawing.

Referring to the drawings by numerals, 5 designates generally the machine which comprises a pair of spaced outwardly diverging plow boards or shoes 6, the same being inwardly inclined toward each other and are provided with beveled front and rear ends 7, and to these boards at their forward ends are fixed vertical bearing plates 8, in which are journaled the reduced trunnion ends 9 of a cross bar 10, to the center of which is rigidly connected a draft tongue or pole 11, the same being braced at opposite sides by brace bars 12, connected thereto and to the cross bar.

Fixed near the rear ends of the plow boards or shoes 6 is an inverted substantially U-shaped bridge piece 13, the latter having fixed thereto at opposite sides guide yokes or brackets 14, the same being slidably engaged by the vertical legs 15, of an inverted U-shaped frame 16, and to this frame is centrally pivoted by a king bolt 17 a turning axle beam 18, which latter is formed with stud axles 19, supporting rotatable ground wheels 20 which are of the ordinary or well known construction.

At a considerable distance forward of the axle beam 18, and fixed to the plow boards 6, is a straddle plate or bar 21, the latter having fixed centrally thereto an upwardly curved spring seat standard 22, carrying a seat 23 of the usual type. Connected centrally to the straddle bar 21, by a pivot 24, is a foot actuated steering lever 25, the same having pivotally connected thereto at opposite ends link rods 26, the latter also being pivotally connected to the axle beam 18, so that upon turning the steering lever 25 a simultaneous movement will be imparted to the axle beam 18, for the proper steering of the machine when in operation.

Fixed centrally to the frame 16 and rising therefrom is a toothed segment 27, the latter having pivotally connected thereto a substantially L-shaped throw lever 28, to the short arm of which is connected one end of a chain 29, which has its opposite end connected to the bridge plate 13, and this throw lever 28 when actuated will cause the raising and lowering of the plow boards or shoes 6, relative to the ground. Mounted upon the throw lever 28, is a manually operable locking pawl 30, which latter is adapted to engage the toothed segment 27, for maintaining the throw lever in its adjusted position.

Pivotally connected to the legs 15 of the inverted U-shaped frame 16, are links 31, the latter also being pivotally connected to opposite sides of the straddle bar 21, and these links 31, movably unite the frame 16, and the straddle bar 21, of the machine.

Disposed near the forward end of the machine 5, are caster wheels 32, the same being journaled in forks 33, which latter are swiveled as at 34 to the short arm of the raising and lowering levers 35, which are pivoted as at 36, to the plow boards or shoes 6, of the machine.

Fixed to the bearing plates 8 and to the plow boards 6 are rack bars 37, the rack teeth thereof being engaged by the levers 35, to hold the caster wheels 32, in vertically adjusted position. It is clearly obvious that the plow boards or shoes 6 may have their forward or rear ends raised or lowered relative to the ground.

In operation the machine is advanced through a field either between the rows of growing plants or by straddling the said rows so as to hoe or hill up the earth along the sides of the row of growing plants. It is clearly apparent that the machine may be utilized for closing open furrows by straddling the same so as to have the plow boards traverse at opposite sides of the open furrow and due to the diverging relation of the said plow boards, the loose earth will be thrown into the open furrow to close it during the advancement of the machine.

From the foregoing explanation it is thought the construction and operation of the invention will be clearly understood without the necessity of a more extended description, therefore the same has been omitted.

What is claimed is:—

A machine of the class described comprising plow boards, the same being inwardly inclined and outwardly diverging with relation to each other, draft means pivotally connected to the forward ends of the boards, a bridge piece connecting the rear ends of the boards, a wheeled axle, a guide frame centrally pivoted to the axle and vertically adjustable on the bridge piece, means mounted upon the frame and having connection with the bridge piece to permit raising and lowering of the boards relative to the ground, a foot steering lever pivotally supported by the boards, links connected to the axle and to the steering lever to effect uniform movement between the same and adjustable guide rollers carried at the forward ends of the plow boards.

In testimony whereof, I affix my signature, in presence of two witnesses.

BENJAMIN E. HELD.

Witnesses:
Louis J. Butts,
Arthur H. Merten.